Patented Jan. 16, 1923.

1,442,321

UNITED STATES PATENT OFFICE.

ERNST BECKMANN, OF BERLIN-DAHLEM, GERMANY, ASSIGNOR, BY MESNE ASSIGNMENTS, TO THE CHEMICAL FOUNDATION, INC., A CORPORATION OF DELAWARE.

PROCESS OF PREPARING A FODDER FROM STRAW, ETC.

No Drawing.  Application filed June 11, 1919.  Serial No. 303,525.

*To all whom it may concern:*

Be it known that I, Professor Dr. ERNST BECKMANN, a citizen of the State of Germany, and residing at Berlin-Dahlem, Thielallee 63, in the State of Germany, have invented certain new and useful Improvements in or Relating to a Process of Preparing a Fodder from Straw, Etc., of which the following is a specification.

For the preparation of a fodder from straw and similar materials characterized by a content of raw fibres such as chaff, Indian corn, forest grass, etc., by disintegrating the same in a chopped condition by means of a lye, such as alkali-lyes, lime-lyes in the form of milk of lime or lime-water, alkaline-sulphides and the like or similarly acting materials such as soda, ammonia, potash, etc., recently a process has been suggested wherein the lye, instead of acting at increased temperature or under steam-pressure, acts upon the straw at ordinary temperature, i. e., without heating, for a longer or shorter period of time, according to the concentration of the lye. A great advantage of this process in comparison with the boiling process resides in the fact, that neither a complicated plant of apparatus nor fuel is required.

Recent experiments undertaken have shown that in those cases where boilers for the disintegrating process have been installed the same may be used in the new process by disintegrating the straw in a heated condition without reaching the boiling temperature of the lye. By heating the lye used for the disintegrating process the speed of the same is increased and a shorter time will be required. Consequently in every case it will be necessary to judge whether the economy in time will compensate for the quantity of fuel consumed for heating the lye. As a satisfactory fodder can be obtained in relatively short time, viz 3 to 12 hours without heating the lye, heating will be economical only when very large quantities are to be disintegrated under condition of forced work in a small plant and where the fuel can be easily and cheaply obtained.

An essential feature of the present invention is that the lye is not heated to its boiling temperature. When boiled the straw becomes fibrous and is partly washed off, further the boiled straw forms into balls and cattle do not eat it as willingly as unboiled straw and finally though a slight change of color does take place the straw retains its former appearance and agreeable aroma practically unchanged. The process may accordingly be carried out in that the straw is treated with a lye that is heated to a temperature below the boiling point of the lye, preferably to 40-60° C. The disintegrating process is completed when the consumption of lye and the solution of the straw fibres do not essentially increase, then the straw is thoroughly washed out. A product similar to that made without any heating is obtained.

What I claim is:—

1. A process for the preparation of a fodder from straw and materials characterized by a content of raw fibres which comprises treating said material in a chopped-up condition by means of alkaline liquors, said liquors being heated to a temperature below the boiling point of the liquor and for a period of from 3 to 12 hours.

2. A process for the preparation of a fodder from straw and materials characterized by a content of raw fibres which comprises chopping the material into small pieces and treating said chopped material with an alkaline liquor at a temperature of 40° to 60° C. and for a period of from 3 to 12 hours.

In testimony whereof I have affixed my signature in presence of two witnesses.

PROF. DR. ERNST BECKMANN.

Witnesses:
 M. BLUMENRICH,
 FRANK ZUCH.